July 7, 1931. W. FERRIS 1,813,040
CONTROL GEAR
Filed June 11, 1923 2 Sheets-Sheet 2

INVENTOR.
WALTER FERRIS
BY Ralph O. Brown
ATTORNEY.

Patented July 7, 1931

1,813,040

UNITED STATES PATENT OFFICE

WALTER FERRIS, OF MILWAUKEE, WISCONSIN, ASSIGNOR TO OILGEAR COMPANY, OF MILWAUKEE, WISCONSIN, A CORPORATION OF WISCONSIN

CONTROL GEAR

Application filed June 11, 1923. Serial No. 644,712.

This invention relates to the automatic control of hydraulic transmission mechanisms for use primarily in presses, boring mills and other types of metal working or wood working machinery.

One object of the present invention is the provision of a hydraulic transmission control gear by which the tool or analogous operating element may be made to automatically perform a predetermined cycle of operations.

Another object is the provision of an automatic control gear of this general character which is readily adaptable to various forms of standard machines and readily conformable to the particular work at hand.

Another object is the provision of time controlled means for predetermining the operating characteristics of a hydraulically driven tool or analogous element.

Another object is the provision of means controlled by the extent of movement of the tool or analogous element for predetermining the operating characteristics thereof.

Another object is the provision of a control gear for hydraulic transmission mechanisms in which the rate of movement of the driven element is subjected to the joint control of a timing mechanism and a mechanism controlled by extent of movement of the element.

Other objects and advantages will appear from the following description of an illustrative embodiment of the invention.

Figure 1:
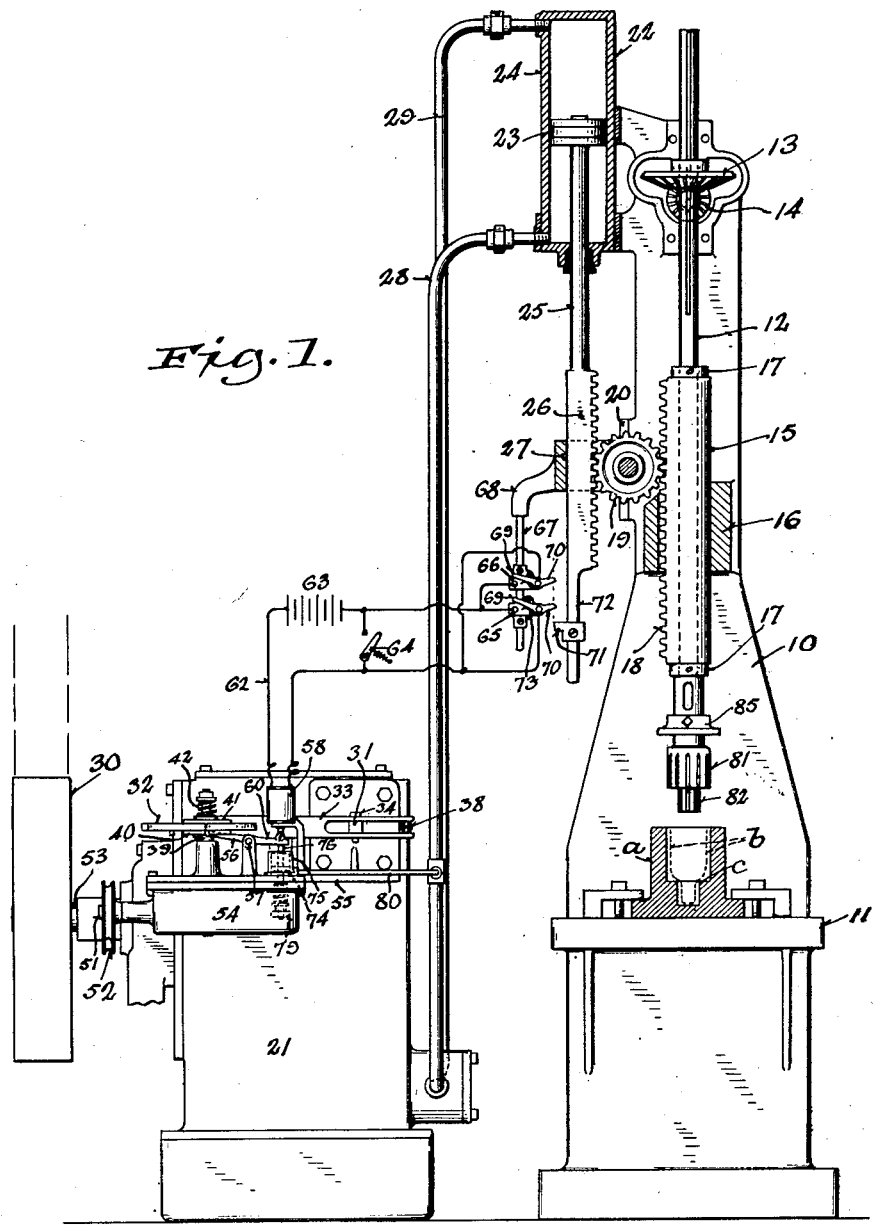
Figure 1 is a view in elevation of a control gear constructed in accordance with the present invention and applied to a boring mill of a well known type.

The boring mill shown in Figure 1 is of a well known type. It comprises an upright frame 10 having the usual work table 11 and drill spindle 12. Rotation is imparted to the spindle in the usual manner through the bevel gear 13 splined thereto and meshing with a second bevel gear 14 driven from an appropriate source of power. Reciprocation of the spindle toward and from the work is effected through the usual sleeve 15 surrounding the spindle and in a fixed guide block 16 carried by the frame. The sleeve is confined between collars 17 fixed to the spindle and is provided with the usual rack 18 in mesh with a gear 19 journaled in a fixed bracket 20 carried by the frame. The arrangement is such that rotation of the gear 19 in one direction or the other will effect reciprocation of the sleeve and consequently the spindle toward or from the work. Since the parts thus far referred to are old and well known in the art, a further or more detailed description thereof is deemed unnecessary.

In this instance, the gear 19 is actuated through a hydraulic transmission mechanism comprising a pump 21 and hydraulic motor 22 driven thereby. The motor shown is in the form of a piston 23 working in a cylinder 24 fixed to the head of the machine frame 10. The piston rod 25 is connected in driving relation with a rack bar 26 reciprocable in a fixed guide block 27 and meshing with the gear 19. The opposite ends of the cylinder are connected through pipes 28 and 29 with the pump 21. The pump is a constant speed, variable displacement pump of a well known type, that shown being fully described in my copending application Serial No. 682,056, filed Dec. 21, 1923. Suffice it to say that this pump is driven at a constant speed from a convenient source of power through appropriate belt and pulley connections 30 the fluid displacement thereof being controlled by a plunger 31. When this plunger is in the neutral position shown, pump displacement is zero and there is no flow of fluid in the pipes 28 and 29. When plunger 31 is shifted outwardly from this position fluid is forced from the pump through pipe 28 to the lower end of the cylinder 24, fluid from the upper end of the cylinder being returned to the pump through pipe 29. This flow of fluid, of course, raises the piston 23 and thereby actuates the gear 19 to advance the drill spindle toward the work. When plunger 31 is shifted inwardly from its neutral position a reverse flow occurs and the drill spindle, through the gear 19 and piston 23, is withdrawn from the work. The rate of flow in either instance is dependent upon the extent of movement of the plunger 31 from neutral position.

The control gear shown provides for the automatic control of the plunger 31 throughout an entire operating cycle. It includes a cam 32 operatively associated with the plunger 31 through a lever 33 having a pin connection 34 therewith. Lever 33 is mounted intermediate its ends upon an appropriate pivot 35 extending through a slot 36 therein so as to permit adjustment of the pivot lengthwise of the lever. A cam roller 37 at one end of the lever is yieldably held against the cam 32 by means of a spring 38.

The cam 32 is loosely mounted upon a shaft 39 between a clutch disk 40 fixed to the shaft and a clutch disk 41 adjustable on the shaft and yieldably held in frictional contact with the cam under pressure of a spring 42. Shaft 39 is driven by a gear 43 fixed thereto and in mesh with a pinion 44 fixed to a countershaft 45. Countershaft 45 carries a gear 46 fixed thereto and meshing with a pinion 47 fixed to a shaft 48 driven by a worm wheel 49. Wheel 49 is driven by a worm 50 fixed to a drive shaft 51. Shaft 51 is driven at substantially constant speed from any appropriate source of power. In this instance, it is shown operatively connected through belt and pulley connections 52 with the pump drive shaft 53. The several gears and shafts just referred to are preferably enclosed in a suitable casing 54 carried by a bracket 55 removably secured to the pump casing.

These gears constitute a speed reduction gear set between the cam 32 and drive shaft 51 and are so selected as to effect rotation of the cam at a rate best suited for the work at hand. In some instances, the gears may be so selected as to effect one complete revolution of the cam during the normal period of time required for a complete operating cycle of the machine, in which event the position of the plunger 31, and consequently the rate and direction of movement of the drill spindle, would be governed entirely by a time factor.

In those instances where greater precision is required than could be satisfactorily attained by relying solely on the time factor, provision is made for placing the control under the influence of a distance factor. To this end, the operation of the control mechanism is made to depend upon the position or extent of movement of the spindle during one or more stages of an operating cycle.

In the control gear shown this is accomplished by dividing the operating cycle into four stages, the cam 32 being provided with four stop pins 55', 55², 55³ and 55⁴, each marking the end of an operating stage. A detent 56 mounted upon a fixed pivot 57 normally projects into the path of travel of these pins so that the cam is held against rotation whenever any one of the pins comes into engagement therewith. The friction clutch, including the elements 40 and 41 above referred to, permits the cam to be so held without interrupting the normal operation of the driving gears.

To permit further rotation of the cam, mechanism is provided for automatically shifting the detent into pin releasing position. This mechanism is preferably placed under the control of a driven element of the machine and, in this instance, comprises a solenoid 58 having an armature 59 connected with the tail 60 of the detent. The solenoid is connected in an electric circuit 62 including a battery 63, or other source of electric energy, the circuit being controlled by a plurality of switches arranged in parallel. One of the switches 64 is under the control of the operator, the other switches 65 and 66 being placed under the control of the machine. Switches 65 and 66 are each adjustably mounted upon a rod 67 supported by a fixed bracket 68 on the machine, and each comprises a switch lever 69 having a tail piece 70 projecting into the path of travel of a dog 71 adjustably secured to an extension 72 of the rack bar 26 hereinabove referred to. Each of the switches is biased toward open position by a spring 73. The arrangement is such that when any one of the switches is closed the solenoid 58 is energized and the detent 56 is actuated thereby to release the pin and permit rotation of the cam.

The detent operating mechanism shown also includes a small piston 74 working in a cylinder 75 and arranged to drive a plunger 76 against the tail 60 of the detent to rock the detent into pin releasing position. The piston is yieldably held in inactive position within the lower end of the cylinder by a compression spring 77 carried by the piston tail rod 78 and interposed between the end of the cylinder and a nut 79 on the tail rod. The lower end of the cylinder is in constant communication with the pipe 28 through a tube 80. The arrangement is such that when a predetermined pressure is built up in the pipe 28, tube 80 and cylinder 75, the piston 74 moves upwardly against the pressure in the spring 77 and through the plunger 76 rocks the detent 56 into pin releasing position. The pressure required to lift the piston 74 may be varied and controlled by adjusting the nut 79 and thus adjusting the spring 77.

The form of the cam 32, the selection of gears 43, 44, 46 and 47 and the character of the detent control mechanism is dependent upon the requirements of the work at hand. In this particular instance the machine is equipped with two cutting tools 81 and 82 of different diameters secured in the usual manner to the end of the drill spindle 12 and the control gear is so designed as to effect a complete boring operation on a cored work piece $a$. The dotted lines $b$ represent the original form of the work piece and the adjacent full lines the final form produced by the boring operation.

Figure 2:
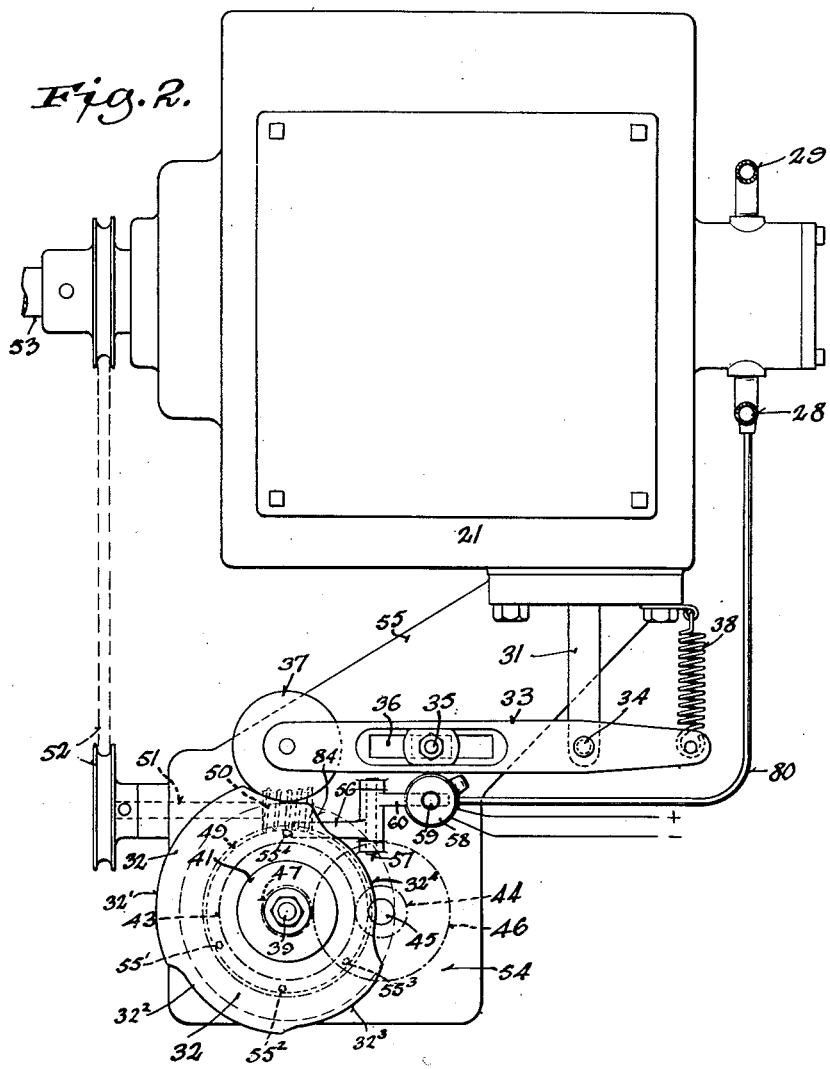
Figure 2 is a plan view, on a somewhat larger scale, of the control gear shown in Figure 1.
Figure 3:
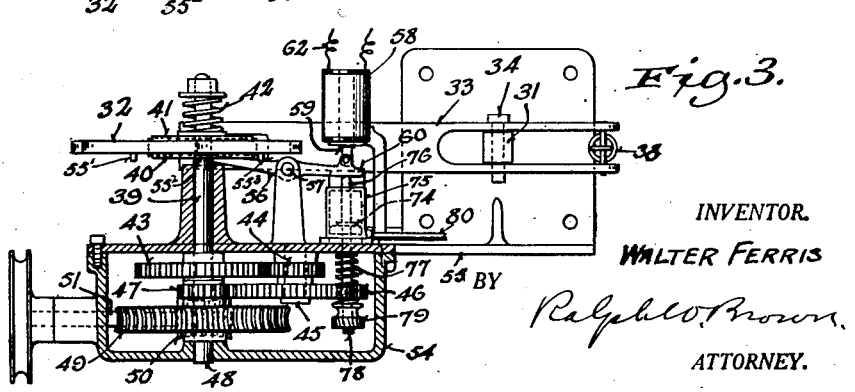
Figure 3 is an elevation, partly in section, of a portion of the mechanism shown in Figure 2.

During operation, the pump drive shaft 53 and the cam drive shaft 51 rotate at substantially constant speed. Before beginning an operating cycle, however, the engagement of detent 56 against pin $55^4$ prevents rotation of the cam. In this position of the cam the roller 37 and consequently lever 33 and plunger 31 are retained in neutral position and pump displacement is zero. To begin a working cycle switch 64 is momentarily closed by the operator, the solenoid 58 is energized and the detent 56 swung to pin releasing position. The cam immediately begins rotation in a clockwise direction (Fig. 2), the lobe 32' thereof lifting the roller 37 and forcing the plunger 31 outwardly. This causes a flow of fluid from the pump 21 through pipe 28 to the bottom of the cylinder 24, thereby forcing the piston 23 upwardly and advancing the drill spindle and tools 81 and 82 toward the work. The height of the lobe 32' causes a rapid fluid flow and consequent rapid advance of the tools. The cam 32 is so timed and the lobe 32' of such length that the roller 37 arrives at the end of the lobe as the tool 81 closely approaches the work piece. At the instant the roller arrives at this point, the pin 55' engages the detent 56 and the cam is temporarily held against further rotation. Then just prior to actual engagement of the tool 81 with the work, the dog 71 in its upward travel closes the switch 65, the solenoid is again energized and the detent shifted to releasing position. Rotation of the cam is thus renewed and the roller 37 drops into the reduced portion $32^2$ thereof, thereby shifting the plunger 31 somewhat toward neutral position. This action of the plunger reduces the fluid flow from the pump so that the piston 23 travels upwardly and the tools downwardly at a slower rate of speed appropriate for a fast boring operation. The cam continues rotation until stopped by engagement of the pin $55^2$ with the detent. This is timed to occur as the roller 37 reaches the end of the reduced portion $32^2$ of the cam and as the tool 82 approaches the shoulder $c$ within the cored work piece. Just before this tool actually engages this shoulder the switch 66 is closed by the dog 71 and the detent is again released by the solenoid. The cam again continues its rotation thereby permitting roller 37 to engage the further reduced portion $32^3$ thereof and thereby shifting the plunger 31 in such direction as to further reduce the pump displacement and to thus reduce the travel of the tools to a slow boring speed. The portion $32^3$ of the cam thus determines the rate of advance of the tools during this final stage in the actual boring operation. During this stage the tools meet with gradually increasing resistance due to increased amounts of material to be removed. To avoid injury to the tools this portion $32^3$ of the cam is gradually reduced so that as the cam rotates the roller 37 and plunger 31 approach quite closely to neutral position and the tools are advanced at a very slow rate. The pin $55^3$ comes into engagement with the detent and the cam is again brought to rest a little before the end of the boring operation. The tools thereafter continue their slow advance until a collar 85 carried by the spindle comes in contact with the top of the work and effectively resists further advance. This results immediately in the building up of pressure in the cylinder 24, pipe 28, tube 80 and cylinder 75 sufficient to lift the piston 74 and thereby cause a release of the detent. The cam is then again free to rotate and the roller 37 falls into contact with the portion $32^4$ of the cam. This portion is sufficiently reduced to permit the lever 33 and plunger 31 to pass through neutral and into reverse position. This causes a reverse flow of fluid from the pump through pipe 29 into the upper end of the cylinder 24 and the piston 23 moves downwardly thereby causing an upward travel of the spindle and tools from the work. Rotation of the cam continues until the roller 37 has been lifted into neutral position by the rise 84 in the cam, thereby reducing pump displacement to zero and terminating the upward travel of the tools. The cam is retained in this final position by engagement of pin $55^4$ with the detent until switch 64 is again closed by the operator to begin a new cycle.

It will thus be noted that in the machine shown the rate of travel of the tools at any instant in a complete working cycle is dependent upon the position of the cam at that instant. Since the cam rotates at a definite speed and since continued rotation of the cam is dependent upon the precise position of the tools at definite stages in the operating cycle, each stage is determined by an approximately computed time element and an accurately determined distance element.

In some instances it may be found desirable to effect fractional adjustments of the rate of travel of the tool. This may be accomplished without requiring recutting of the cam by adjusting the pivot 35 lengthwise of the lever 33 and thereby changing the relative lengths of the lever arms between the roller 37 and pivot and between the pivot of plunger connection 34, respectively. Thus, by adjusting the pivot 35 to the left (Fig. 2) the movement of the plunger 31 is increased relatively to the movement imparted by the cam to the roller 37. Adjustment of the pivot in this manner produces a proportionately greater effect on the plunger 31 during slow feeds than during fast feeds of the tool.

Various changes may be made in the embodiment of the invention hereinabove described, without departing from the invention as defined in the appended claims.

I claim:

1. In a machine tool or the like having a driven element, a variable displacement pump, means actuated by fluid delivered by said pump for driving said element through successive stages of an operating cycle, mechanism for regulating pump displacement, a cam for controlling said mechanism, means operable independently of said element for driving said cam during each stage, and means controlled by said element for interrupting the action of said cam at the end of each stage of the cycle.

2. In a machine tool or the like the combination of a driven element, a variable speed hydraulic transmission mechanism for driving said element through successive stages of an operating cycle, regulating means for said mechanism, a member driven at a predetermined speed during each stage for controlling said regulating means, and means controlled by said element for interrupting the action of said member at the end of each stage.

3. The combination with a variable speed hydraulic transmission mechanism, and an element driven thereby, of means for regulating said mechanism to regulate the speed of said element, a cam for controlling said regulating means, a lever between said cam and means, and a support for said lever adjustable to vary the effect of said cam on said means.

4. The combination with a variable displacement pump of means for regulating pump displacement, a power driven cam for controlling said means, and a lever between said cam and means, said lever being adjustable to vary the effect of said cam on said means.

5. The combination of an operating element, mechanism including a variable displacement pump for driving said element, means including a cam associated with said pump for determining the rate of movement of said element during successive stages of an operating cycle, means for driving said cam substantially throughout each stage, and means controlled by the position of said element at successive stages of the cycle for modifying the action of said cam.

6. In a machine having an operating element, the combination of a cam for determining the operating characteristics of said element throughout successive stages of an operating cycle, means for driving said cam substantially throughout each stage, and means controlled by said element for intermittently interrupting the action of said cam until said element reaches predetermined positions at successive stages in the cycle.

7. In a machine tool or the like the combination of a driven element, a variable speed hydraulic transmission mechanism for driving said element, speed regulating means for said mechanism, means for controlling said regulating means, means for driving said control means at a predetermined rate to normally effect variations in speed in said driven member at predetermined time intervals, and detent mechanism controlled by the position of said element for modifying the action of said control means.

8. The combination of a hydraulic transmission mechanism including a reversible flow variable displacement pump, means for reversing said pump, and means responsive to an increase of pressure in said mechanism for effecting the operation of said reversing means.

9. The combination of a tool carrier, a work support, means for effecting relative reciprocation between said carrier and support to engage the tool and work, reversing mechanism for said means, and means responsive to a predetermined pressure between said tool and work for effecting the operation of said reversing mechanism.

10. The combination of a tool carrier, a work support, hydraulic transmission mechanism for effecting relative reciprocation between said carrier and support to engage the tool and work, reversing mechanism for said tool and work, reversing mechanism for said transmission mechanism, and fluid actuated means responsive to the pressure between said tool and work for effecting the operation of said reversing mechanism.

11. The combination of a hydraulic transmission mechanism, an element driven thereby, and means comprising an electric circuit including switch mechanism controlled by said element for varying and controlling the operation of said mechanism and consequently the rate of movement of said element.

12. The combination of a hydraulic transmission mechanism, an element driven thereby, power driven means for varying and controlling the operation of said mechanism and consequently the rate of movement of said element, and means comprising an electric circuit including switch mechanism controlled by said element for controlling the operation of said power driven means.

In witness whereof, I hereunto subscribe my name this 4th day of June, 1923.

WALTER FERRIS.